United States Patent [19]

Scher et al.

[11] 4,093,766

[45] June 6, 1978

[54] THREE-COLOR HIGH PRESSURE DECORATIVE LAMINATE HAVING REGISTERED COLOR AND EMBOSSING

[75] Inventors: Herbert I. Scher, Randallstown; Joseph A. Lex, Glen Burnie; Israel S. Ungar, Randallstown, all of Md.

[73] Assignee: Exxon Research and Engineering Company, Linden, N.J.

[21] Appl. No.: 797,205

[22] Filed: May 16, 1977

Related U.S. Application Data

[63] Continuation of Ser. No. 594,094, Jul. 8, 1975, abandoned.

[51] Int. Cl.² ..................... B32B 3/30; B32B 31/20
[52] U.S. Cl. ..................... 428/165; 101/32; 156/61; 156/222; 156/289; 264/131; 264/132; 264/137; 427/276; 428/172; 428/204; 428/207; 428/339
[58] Field of Search ........... 156/219, 226, 221, 222, 156/281, 61; 428/151, 156, 161, 165, 172, 195, 207, 204, 339; 264/129, 131, 132, 134, 135, 284, 319; 427/256, 271, 276, 277; 101/32

[56] References Cited

U.S. PATENT DOCUMENTS

| | | | |
|---|---|---|---|
| 3,219,506 | 11/1965 | Dusona, Jr. et al. | 156/220 |
| 3,379,560 | 4/1968 | Thorp | 428/174 |
| 3,666,604 | 5/1972 | Coffet | 156/199 |
| 3,802,947 | 4/1974 | McQuade, Jr. | 156/220 |
| 3,808,024 | 4/1974 | Witman | 428/156 |
| 3,814,647 | 6/1974 | Scher et al. | 156/219 |
| 3,823,046 | 7/1974 | Yamagishi | 156/220 |
| 3,905,849 | 9/1975 | Bomboire | 264/132 |

*Primary Examiner*—Stanley S. Silverman
*Attorney, Agent, or Firm*—Karl W. Flocks

[57] ABSTRACT

A decorative high pressure laminate having registered color and embossing is produced by effecting a simultaneous embossing and laminating using a three-dimensional press plate acting against an overlay sheet containing high flow melamine resin and pigment beneath which lies a melamine resin impregnated print sheet and below that an underlay sheet containing high flow melamine resin and pigment of another color. During the pressing operation the resin and pigment in the overlay flow laterally from the high pressure areas to the low pressure areas with the result that the underlying print sheet is visible through the overlay sheet in the high pressure areas while the pigment in the overlay sheet in the low pressure areas masks the print sheet. In areas of even lower pressure the color from the underlay sheet strikes through to the surface to provide a third color.

14 Claims, 2 Drawing Figures

THREE-COLOR HIGH PRESSURE DECORATIVE LAMINATE HAVING REGISTERED COLOR AND EMBOSSING

This is a continuation, of application Ser. No. 594,094, filed Jul. 8, 1975, now abandoned.

FIELD OF INVENTION

The present invention relates to high pressure decorative laminates and, more particularly, to such high pressure decorative laminates having aligned color and embossing which are in exact registry, and a process for preparing such laminates.

BACKGROUND

The production of high pressure laminates is well known, having been carried out for many years. Generally, the procedures for forming such laminates involve providing phenolic (i.e. phenol-formaldehyde) resin impregnated paper core sheets and melamine (i.e. melamine-formaldehyde) resin decorative and overlay sheets, and pressing the stacked resin impregnated sheets under heat on the order of 230°–310° F. and under pressure of approximately 800–1600 psi until the resins have become thermoset, thereby providing an extremely hard, attractive and permanent surfacing material known as a "high pressure laminate" meeting NEMA Standards. These high pressure laminates have, for many years, found use as counter and table tops, bathroom and kitchen work surfaces, furniture and cabinet surfacing, wall paneling and partitionings, doors, etc.

Most general purpose decorative high pressure laminates, of about 1/16 inch thickness, are formed of an assembly comprising a top ply of α-cellulose paper, about 20 lbs. ream weight, impregnated with a partially cured water solution of melamine-formaldehyde condensate; a print ply therebeneath, normally also an α-cellulose paper, pigment filled, with or without decorative printing on the surface thereof, ranging in weight from 50 to 125 lbs. ream weight and also impregnated with a partially cured amino resin condensate, usually the same melamine resin as used in the overlay ply; and therebeneath a plurality (e.g. six) core plys which are normally 100–130 lb. ream weight kraft paper, impregnated with a water or alcohol soluble partially cured phenolic resin condensate. All of such partially cured resin condensates are referred to as being in the "B-stage"; in this stage they are thermoplastic and will flow under heat and pressure during the high heat, high pressure laminating procedure.

The above described assembly is repeated, back-to-back with a separator, each two laminates being separated by a pressing plate die, until a "book" containing, typically, 10 assemblies is obtained. The book is inserted in a high pressure press, and the laminates are cured under the conditions of heat and pressure indicated above. During the pressing cycle, the resins flow and cure, consolidating the individual plys and forming a comprehensive and infusible cross-linked product. After cure, the book is removed from the press and the laminates are separated, trimmed, and their backs or bottom surfaces sanded to improve adhesion for subsequently gluing to various substrates.

In the early years, generally only glossy surface laminates were produced (i.e. using polished molding surfaces), though some attempts were made to provide laminates with some slight surface irregularities to give satin or "textured" finishes. In more recent years it has become increasingly desirable to provide various types of irregular surfaces, ranging from relatively shallow depressions such as textured (e.g. satin, matte, or semi-gloss) surfaces, to relatively deeply "sculptured" or embossed surfaces which have a noticeable three-dimensional effect, such as wood grain, leather, slate, abstract patterns, creative designs, etc. Particularly with the rising costs of natural products, it has become more desirable to provide deeply sculptured high pressure laminates which simulate natural materials such as wood, leather and slate.

Today, high pressure decorative laminates meeting NEMA standards are manufactured with smooth glossy surfaces, with textured surfaces, or with deeply sculptured or embossed surfaces. In the latter case, a textured surface is usually superimposed on the embossed surface, and these textured surfaces are normally obtained by utilization of a release, parting or separating membrane or sheet of known type which is located, during the laminating operation, between the upper surface of the uppermost laminate and the molding plate die. In the production of deeply sculptured surfaces which simulate natural products such as slate, leather and wood, it is particularly desirable that the textured surfaces be superimposed over the face of the simulated product, since this provides a softer and more naturally appearing product.

In the manufacture of deeply embossed or sculptured surfaces having surface depth variations as great as 7 mils which duplicate natural products such as slate, leather, wood and the like, it has in the past generally been necessary to use either extremely expensive etched steel or stainless laminating die plates or, alternatively, thermoset pressing plate dies such as described in the Michaelson et al U.S. Pat. Nos. 3,303,081 and 3,311,520. While the use of such dies provides the necessary embossing, many simulated natural products, such as wood grain, must have appropriate color in registry with the surface embossing or debossing. Unfortunately, the problem of registration of color and embossing has proved very difficult, conventional registry techniques such as used in the printing industry being unreliable on a consistent basis in the manufacture of high pressure laminates, and also being extremely expensive, often involving complex electronic sensing equipment.

Other methods of providing laminates having registered color and texture have utilized valley printing, namely the inking of high portions of an engraved plate and pressing into the resin while curing. This operation, as well as the mechanical registration of an embossing roll or plate with a print, is difficult to carry into production and/or does not always give a uniform product. In addition, inks may not be compatible with or as durable as the base resin in which case the product will not meet NEMA Standards.

In more recent years, a number of other techniques have been developed in an attempt to solve the problems of registration of color and embossing in the manufacture of deeply sculptured high pressure laminates. Certain of these techniques have been found to be highly useful in the preparation of certain specific types of configuration, e.g. see U.S. Pats. Nos. 3,700,537 and 3,698,978. Other recent techniques have been more versatile from the viewpoint of the design of the product (note, e.g., U.S. Pat. Nos. 3,814,647; 3,732,137; 3,802,947; and 3,661,672), but some of these recent techniques have been less than fully desirable because they require special materials and/or are difficult to carry out successfully with the result that the products are sometimes inconsistent or the manufacturing operation is more expensive than is desirable.

In co-pending application, Ser. No. 528,776, there is disclosed a method which involves using, in place of the conventional overlay sheet, a light weight overlay sheet which is impregnated with melamine resin containing finely ground pigment. During the simultaneous embossing and laminating using a three-dimensional press plate acting against such overlay sheet, the resin and pigment in the overlay flow laterally from the high pressure areas to the low pressure areas with the result that the underlying print sheet is visible through the overlay sheet in the high pressure areas while the pigment in the overlay sheet in the low pressure areas masks the print sheet. This technique gives highly realistic products of a generally mottled nature, such as simulated leather, but the variation in colors which is possible using this technique is somewhat limited.

SUMMARY

It is, accordingly, an object of the present invention to overcome deficiencies in the prior art, such as indicated above.

It is another object of the present invention to provide improved high pressure decorative laminates.

It is another object to provide a unitary high pressure decorative laminate having a plurality of registered colors and embossing in different areas, particularly mottled, irregular patterns such as those simulating natural products, and most particularly simulating a stony product.

It is another object to provide a unitary high pressure laminate having a plurality of registered colors and embossings in different areas in a simple and inexpensive manner.

It is another object of the present invention to provide a new and improved method for inexpensively manufacturing high pressure laminates having registered color and embossing.

It is another object of the present invention to provide a high pressure decorative laminate having registered color and texture such that the surface of the laminate has high durability sufficient to meet NEMA Standards, and in which good registration of a plurality of colors is obtained.

In the present exemplification of this invention, there is disclosed a method which involves using, in place of the conventional overlay sheet, a light weight overlay sheet which is impregnated with melamine resin containing finely ground pigment. Below the conventional print sheet there is provided an underlay sheet also impregnated with melamine resin containing a different colored finely ground pigment. The pigment lies in the resin and does not become greatly impregnated into the paper fibers nor fixed to the cellulose of the paper. The resin content, volatile content and flow are so selective that during pressing most of the resin and pigment flows laterally in the overlay sheet from the high pressure areas to the low pressure areas as described in application Ser. No. 528,776Δ. In addition, in areas of lower pressure the pigment and resin from the underlay sheet strike vertically through the print sheet and the overlay sheet. The resultant product has registered embossing and coloring with the pigment of the overlay being concentrated in the medium areas, the print sheet showing through as the debossed areas and the color of the underlay sheet appearing at the embossed areas.

Δ Incorporated herein by reference

BRIEF DESCRIPTION OF DRAWINGS

To the attainment of these ends and the accomplishment of the above as well as other new and useful objects as will appear below, the invention relates to the features of novelty in substantially the construction, combination and arrangement of the several parts hereinafter described and shown in the accompanying drawing as an example illustrating this invention, and in which.

DETAILED DESCRIPTION OF EMBODIMENTS

Figure 1:
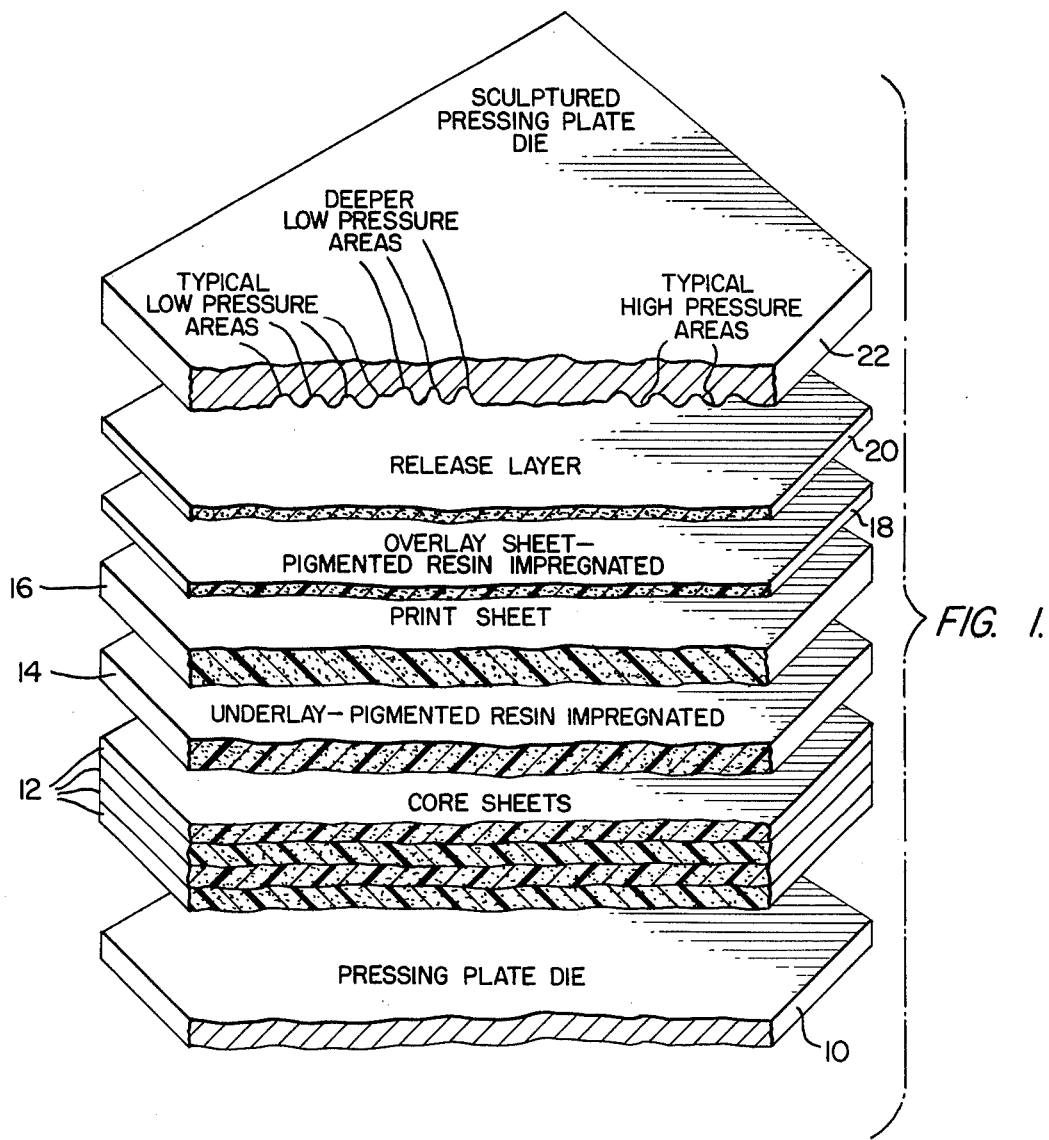
FIG. 1 schematically shows the formation of a high pressure laminate in accordance with the present invention.

Referring to FIG. 1, there is seen an assembly for producing embossed decorative high pressure laminates having different levels and in which different colors appear at the different levels. From the bottom up there is provided the conventional bottom pressing plate 10 having a flat, but unfinished surface; the conventional plurality of phenolic resin impregnated paper core sheets 12; a special underlay sheet 14; a conventional amino resin impregnated colored print sheet 16; a special overlay sheet 18; a conventional parting or release layer 20; and the sculptured or embossed pressing plate die 22.

The overlay sheet 18 differs from the conventional melamine resin impregnated α-cellulose paper impregnated overlay sheet normally used in a high pressure laminate lay-up or assembly in that it is impregnated with an opacifying pigment contained in a conventional melamine resin. The combination of melamine resin and pigment is such that during the pressing operation most of the resin and the pigment will migrate laterally through the overlay sheet from the high pressure areas to the low pressure areas so that in the final laminate the debossed areas will be relatively free of pigment in the overlay sheet so that the print sheet therebeneath will be visible, while in the embossed areas the pigment will be relatively concentrated so as to mask the print sheet therebeneath.

The lightweight overlay sheet 18 is prepared in the normal manner except that a finely divided opacifying pigment is utilized with the melamine resin. Thus, the lightweight α-cellulose paper is impregnated with the melamine resin containing the selected pigment; however, the pigment does not become embedded to any significant degree and does not become bound to the cellulose of the paper. The amount of pigment in the melamine resin is a function of the color and hiding power of the pigment selected, although typically they will be used in an amount of 0.5 to 10% by weight of pigment based on the resin impregnating solution.

Preferably the pigments are predispersed in water, since this eliminates milling or grinding in conjunction with the resin, which has a tendency to advance the resin cure in an undesirable manner. After predispersing the pigments in water, the dispersion is mixed with the normal type of melamine resin solution, e.g. a 10–90 mixture of isopropyl alcohol and water to which normal adjuvants are added. The normal impregnating procedures are used by passing the α-cellulose paper through the resin solution containing the dispersed pigment in order to saturate the paper, and then wiping excess liquid from the surface of the paper, and finally drying in an oven at 250°–350° F.

In order to obtain the objectives of lateral flow of resin and pigment during the pressing operation, it is normally preferred that the resin content in the dried overlay sheet be 65–70%, that the volatile content be 6–10%, and that the flowΔ be 7–35%. Higher flow results in undesirably greater transparency in the debossed portions of the laminate so that there is undesirably high show-through of the underlying print sheet; if sufficient flow is not provided, results will be undesirable in that sufficient contrast will not be provided. Accordingly, it is preferred that flows of 7–15% be provided, since these produce the most satisfactory results.

Δ flow is measured by weighing 12 impregnated paper disks of 1⅜ inches diameter, laminating them at 305° F. and 1000 psi, removing the flash from the circumference, and calculating the weight loss as follows: FLOW = Weight Loss × 100/Original Weight It has been determined that the degree of flow is critical, although the degree of flow to obtain success is also dependent on the depth of the debossing elements of the pressing plate die so that with greater depth of the debossing portions of the die, the degree of flow may be less, while with shallower debossing portions of the die, the degree of flow must be greater. If flow is too low, the print sheet color will not show through; if the flow is too high, most of the color flows away and the color becomes diffused.

Increasing the resin and/or volatile content will increase the flow. If the volatile contents are too high causing increased flow, the surface may "milk out" causing too low a resin content in the debossed portions and thereby giving an unsatisfactory product in which the debossed portions are dry and insufficiently hard and resistant. The flow is regulated by a combination of resin content, volatile content and by the temperature at which the paper is dried. Those having normal skill in the art will be able to provide a flow within the range of 7–35% based on current knowledge.

The underlay sheet 14 may be identical to the overlay sheet 18 except for the color of the pigment in the resin which is impregnated into such underlay sheet. The manner of impregnating and the processing parameters described above in relation to the overlay sheet 18 are equally applicable to the preparation of the underlay sheet 14. As a general rule, it may be stated that the underlay sheet 14 will contain more resin than normal, will be pigmented with a dark pigment and, like the overlay sheet 18, will contain very high flow melamine resin. The resin content of the underlay sheet 14 should be at least 59%, and the volatile content may lie from 4.9% to 12.5%. The nature of the paper from which the underlay sheet is formed is not critical.

The underlay sheet 14 may be impregnated in various patterns with different colors, e.g. by silk screening or even by splattering. There should be spaces between the different colors applied to or coated on the underlay paper to assure avoidance of blending between adjacent colors. The different colors may be applied in a polka-dot pattern, or in wavy line patterns. Alternatively, a purposeful pattern may be provided to give the final product a definite rather than random appearance. In this manner many interesting and desirable graphic effects can be provided in the final product.

The sculptured pressing plate die 22 may be any of the known types provided the depressions in its surface are adequate for the purpose of the present invention as described below. Insofar as general types of pressing plate dies 22 are concerned, one may use an expensive machined or etched steel or stainless steel plate, or one may use a molding plate of the type described in the Jenkins U.S. Pat. No. 2,606,855, or the Michaelson et al U.S. Pat. Nos. 3,303,081 and 3,311,520. Also, one may use a thin, embossed, impregnated separator sheet having a non-stick facing of the type disclosed in the Scher et al U.S. Pat. No. 3,674,619 as the embossing surface, in which case the release layer 20 may be eliminated along with the sculptured printing plate die 22, though a flat pressing plate of the nature of pressing plate die 10 will be used to back up the thin, embossed, impregnated separator sheet.

The depth of the depressions in the printing plate die 22 are a critical aspect of the present invention. In general, the color carried by the underlay sheet 14 shows through to the surface of the resultant laminate when the debossments or depressions in the pressing plate die are relatively deep and sharp. More specifically, if the depressions in the pressing plate die 22 are from 2 to 10 mils deep, the color on the resultant embossment of the laminate will be the color of the pigment in the overlay sheet 20 as described in co-pending application Ser. No. 528,776. If the depressions in the pressing plate die 22 are from 14 to 24 mils deep, the resultant peaks on the laminate will be the color of the pigment in the resin of the underlay sheet 14. If the depressions in the sculptured pressing plate die 22 are of the intermediate depth of 11 to 13 mils, the resultant peaks will mostly be the color of the pigment of the overlay sheet 18, but occasionally the color of the pigment provided in the resin of the underlay sheet 14 will appear on these peaks.

In those instances where a release or parting layer 20 is used, such layers may be selected from those commercially available. These release layers 20 usually provide the dual function of imparting a textured finish to the laminate and also preventing adhesion of the upper surface of the laminate, i.e. the overlay layer 18, to the sculptured pressing plate die 22. Among the release sheets 20 commercially available may be mentioned aluminum foil, silicone resin or silicone oil treated paper, "Quillon" treated paper, fluorocarbon resin treated paper, sodium alginate treated paper, paper-aluminum foil laminate, parchment or glassine papers, etc. Any of these materials may be used as the release layer 20, so long as the non-adherent surface of the release layer 20 is facing the overlay 18.

The print or pattern sheet 16, sometimes called the base layer, may be of the conventional type, either of one color or of a plurality of colors. The color may be applied to the upper surface of the base layer, or it may be internally applied. As indicated above, the base layer will normally comprise a pigmented or dyed α-cellulose paper impregnated with clear melamine resin. The color of the print or base layer is chosen for its desired contrast to the pigments used in the overlay sheet 17 and the underlay sheet 14.

The plurality of core sheets 12 will normally comprise kraft paper impregnated with phenolic resin in accordance with usual practice. The pressing plate die 10, located immediately below the core sheets 12, may comprise a simple metallic plate, such as is conventionally used.

The lay-up or assembly or composite is cured using a normal pressing cycle at 800–1200 psi and 260°–310° F.

for 45–90 minutes, the press time given assuming starting with a cold press and ending cold.

During pressing, several things occur. The melamine resin first melts, then flows and finally cures to a hard, infusable state. As indicated above, the colors appearing on the surface of the resultant laminate depend upon the depth of the depressions in the sculptured pressing plate die 22, and it will be understood that the present invention is particularly suitable in making laminates which have a stony or pebbly appearance in three or more colors. At the completion of the pressing operation, there is provided a laminate having a pleasing texture in which at the highest peak there is present the color of the pigment of the underlay 14, at the lower peaks is provided the pigment of the overlay sheet 18, and at the valleys is provided the color of the base layer 16.

It is clear that the pigment and most of the resin in the overlay sheet 18 move laterally from the high pressure areas to the intermediate low pressure areas as described in co-pending application Ser. No. 528,776. The resultant product, considering for the moment just the valleys and the lower peaks in the product, shows varying amounts of the print sheet color in the valleys, depending on the thickness of the overlay sheet 18, and also dependant on the varying pressure from point to point which in turn depends on the design and depth of the depressions in the pressing plate die 22 as mentioned above.

The color of the pigment impregnated into or coated on the underlay sheet 14 will appear on the highest peaks of the product, and this is extremely surprising. In some way the resin and color from the underlay sheet 14 passes through both the solid color base or print sheet 16 and through the pigmented overlay sheet 18. This color, which is preferable a darker color than either the color of the print sheet or the pigment impregnated into the overlay sheet, is believed to somehow "bleed" through to the surface of the laminate. The apparent reason for this phenomenon is that the very high peaks, corresponding to depressions in the pressing plate, cause low pressure areas during the initial part of the pressing cycle; since the lower layers of the laminate are subject to a relatively uniform distributed pressure at the same time, there is a pressure differential that causes the pigmented resin in the lower underlay sheet 14 to flow toward the sharp peak areas in the surface, and when this differential pressure is great enough, the pigmented resin from the underlay sheet 14 can flow through the print sheet 16 and the overlay sheet 18 and become visible at the surface.

It should be understood that the above explanation is only a theory to which the invention is not to be limited. Another theory, possibly related to the first, is that the solid color base sheet 16 cracks during pressing in areas adjacent the deep and sharp debossment in the plate 22 and that the pigmented resin from the underlay sheet 14 leaks up through the cracks in the solid color base sheet 16 in these areas. Neither of the above theories has been verified and it may only be that the pigmented resin from the underlay wicks through the solid color base sheet 16 in some unexplained manner.

Regardless of the theory, the result is highly surprising, particularly in view of the results which occur in co-pending application Ser. No. 528,776. In the copending application, the solid color base sheet provides its colors at the areas of debossment rather than at the areas of embossment; in the present case, the layer which is beneath the solid color base sheet, i.e. the underlay sheet 14, provides its color at the embossment rather than at the debossment and this color must strike through both the solid color base sheet 16 and the pigmented resin impregnated overlay sheet 18.

Figure 2:
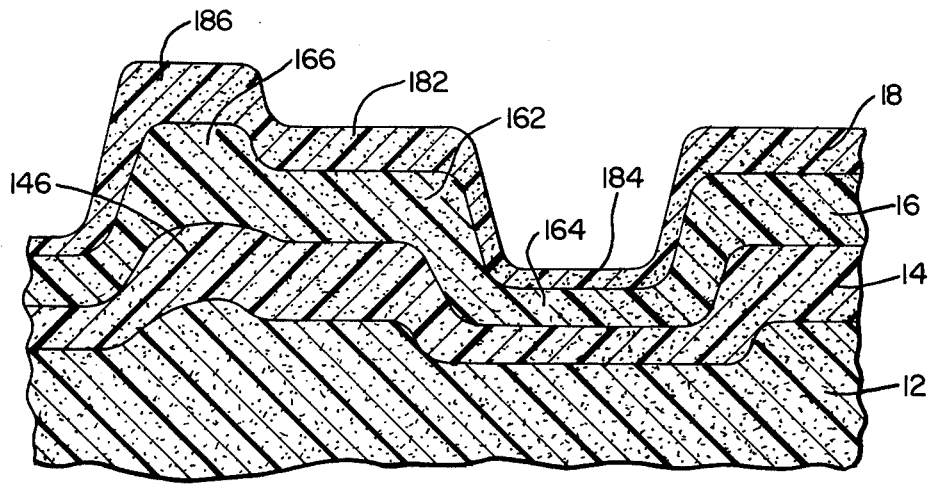
FIG. 2 is a schematic cross section of a portion of a laminate in accordance with the present invention.

Referring to FIG. 2, there is shown a small section of a cross section of a laminate produced in accordance with the present invention. The invention is particularly suited to the production of mottled, stony-looking products. From FIG. 2 it is seen that in the debossed portions or valleys the overlay 18 is relatively thin at 184 and the base or print layer 16 can be seen at portion 164 through the relatively transparent portion 184 of the overlay sheet. To the contrary, at the intermediate peaks or embossed portions the overlay sheet 18 is relatively thick at portions 182 and the pigment therein, having migrated from portion 184, is relatively dense so that the print layer 16 at portion 162 is not visible through the opaque portion 182 of the overlay sheet 16. Between the two extremes there is a gradual transition.

At the highest peaks the product is provided with a third color which bleeds from the underlay sheet 14 at portion 146 through portion 166 of the print layer 16 and into portion 186 of the overlay sheet 18 where the dark pigment from the underlay sheet 14 predominates.

The product is provided with embossed high peaks, embossed low peaks and debossed valleys by pressing against the sculptured pressing plate die 22. The resulting laminate has the color of pigment in the overlay sheet 18 at the embossed portion 182, the color of the pigment of the underlay sheet 14 at the highest peaks 186, and at the debossed valley portions has the color of the print sheet 16 as seen through the transparent portion 184 of the overlay sheet 18. In general, it will be understood that while various color combinations are possible, best results are obtained when the color of the print sheet 14 is lightest, the color of the pigment in the overlay sheet 18 is of intermediate darkness and the color of the pigment in the underlay sheet 14 is darkest.

The above process is not limited to high pressure laminates, but is equally applicable to the so-called low pressure board where surface sheets are applied directly to particle board.

The following examples, offered for purposes of further illustration without limitation, will more fully reveal the nature of the invention.

EXAMPLE I

The assembly shown in FIG. 1 was prepared with the pressing plate die having the negative configuration of a pebbly or stony product. The depressions in the plate 22 were irregular in shape and irregularly spaced varying in width or diameter from about 1/64 inch to as great as ¼ inch, most of the depressions having a length or diameter of about 1/16 to ⅛ inch and a width of about 1/32 to 1/16 inch. The depressions varied in depth from 2 mils to 24 mils.

The overlay sheet conformed to the requirement of copending application Ser. No. 528,776 and contained a dark gray pigment. The print sheet 16 was colored a solid light gray.

The underlay sheet 14 was impregnated to 70% resin content, 8% volatile content and 20% flow, and contained a finely ground dark brownish-red pigment.

Beneath the underlay sheet 14 was provided six core layers in accordance with conventional practice, and the assembly, using a metal foil separator and the pressing plate above the overlay sheet, was pressed at 1000 psi under heat for fourteen minutes to provide six minutes at 295° F., and was then cooled for five minutes. The resultant surface reproduced the stony configuration of the laminating die plate. The color of the valleys was a uniform light gray, most of the peaks were dark gray and the higher peaks were a reddish brown.

EXAMPLE TWO

Example One was repeated, except that the sculptured pressing plate die was changed so that all the deeper depressions or low pressure areas appeared in a cross-shaped area. In addition, the color of the pigment in the underlay sheet 14 was dark green. The resultant laminate over most of its surface was provided with a light gray background with darker gray peaks, except that in the area of the cross a number of peaks were dark green and the shape of the cross was very apparent at some distance from the laminate.

EXAMPLE THREE

Example One was repeated except that the underlay was provided with different colors in different areas in a polka-dot pattern. The resultant laminate had four distinct colors including the first color corresponding to the color of the print sheet which appeared in the valleys, the second color corresponding to the color of the pigment in the overlay sheet at the intermediate peak, and the third and fourth colors appearing in different areas at the higher peaks corresponding to the two colors provided on the underlay sheet.

EXAMPLE FOUR

Example one was repeated except that a secondary pattern was silk screened on upper overlay. Resulting laminate had four colors with patterns showing in different areas at the peaks.

EXAMPLE FIVE

Example three was repeated except that underlay was composed of a die cut pattern of differently pigmented papers. This resulted in five colors. The first came from top overlay. The second from base paper. The other three colors came from each of the two underlay colors and their interaction when one crosses the other.

It is understood that the invention is not limited to the embodiments disclosed above which are illustratively offered, and that modifications may be made without departing from the scope of the invention.

What is claimed is:

1. A method of forming a unitary decorative laminate having registered color and embossing, comprising:
   A. assembling in a stack from the bottom up:
      (1) backing means for said decorative laminate,
      (2) a fibrous underlay sheet impregnated with a thermosetting resin impregnating solution having dispersed therein finely divided pigment of a first color, said pigment being retained substantially between the fibers of said underlay sheet,
      (3) a thermosetting resin impregnated fibrous print sheet provided with a second color contrasting with said first color,
      (4) a fibrous overlay sheet impregnated with a thermosetting resin impregnating solution having dispersed therein finely divided pigment of a third color contrasting with said first and second colors, said pigment of said third color being retained substantially between the fibers of said overlay sheet, and
      (5) a sculptured pressing plate die having a surface with high areas, intermediate areas and low areas capable of being impressed into the uppermost of said fibrous sheets, and means to prevent said sculptured pressing plate die from sticking to said overlay sheet during lamination;
   B. applying to the upper and lower surfaces of said assembly sufficient heat and pressure to cure said resins to produce said unitary embossed decorative pressure laminate by
      (1) effecting a lamination of said fibrous sheets together with each other and with said backing means,
      (2) imparting the sculptured surface of said die to the uppermost of fibrous sheets,
      (3) effecting lateral flow of said thermosetting resin and the pigment of said third color within said overlay sheet from the debossed portions of the surface of said laminate to the intermediate portions of said laminate so that said second color is visible in said debossed portions and said third and contrasting color of said finely divided pigment is visible in said intermediate portions, and
      (4) effecting vertical flow of said thermosetting resin and the pigment of said first color within said underlay sheet from said underlay sheet to the upper surface portion of said overlay sheet in the areas of the highest peaks so that said first color is visible in the highest embossed portions to contrast with the second color at said debossed portions and the third color at said intermediate portions; and
   C. stripping said sculptured die from the resultant laminated assembly so as to provide said laminate having areas of registered color and embossing.

2. A decorative laminate formed by the process of claim 1.

3. A method in accordance with claim 1 for forming a high pressure decorative laminate, wherein said backing means comprise phenolic resin impregnated core sheets, said print sheet comprises a melamine resin impregnated α-cellulose paper, and said overlay sheet comprises melamine resin impregnated α-cellulose paper.

4. A method in accordance with claim 3, wherein said means to prevent said sculptured pressing plate die from sticking to said overlay sheet comprises a separate release sheet.

5. A method in accordance with claim 3, wherein said α-cellulose overlay sheet has a melamine resin content in the 65–70% range, a volatile content of 6–10% and a flow of 7–35%, and said underlay sheet has melamine content of at least 59%, a volatile content of 4.9% to 12.5% and a flow of 7–35%.

6. A method in accordance with claim 3 for forming a high pressure decorative laminate simulating a pebbly surface, wherein said underlay sheet is provided with a plurality of separate, discretely spaced colors.

7. A decorative high pressure laminate having the appearance and texture of a pebbly surface and having at least four colors, formed by the method of claim 6.

8. A method in accordance with claim 3, wherein said sculptured pressing plate die comprises depressions from 14 to 24 mils deep for providing in the resultant laminate said peaks having said first color, and depressions 2–10 mils deep for providing in the intermediate portions of the resultant laminate said second color.

9. A method in accordance with claim 8, wherein in step B said assembly is pressed at approximately 800–1600 psi at a temperature on the order of 230°–310° F.

10. A unitary decorative high pressure laminate having a pebbly appearance, comprising
   a plurality of resin impregnated paper sheets laminated together to form an integral laminate having a plurality of layers and having on the upper surface thereof debossed portions, embossed portions of intermediate height 2–10 mils, and embossed high peaks of 14–24 mils height;
   the upper layer of said laminate having therein at least one first color in the area of said high peaks;
   said debossed portions being relatively devoid of pigment within the upper layer and being transparent to show therebeneath a second color; and
   said intermediate embossed portions having concentrated porportions of an opacifying pigment of a third color in the upper layer of said laminate, wherein there is a gradual transition of said second and third colors between said intermediate height portions and said debossed portions.

11. A laminate in accordance with claim 10 comprising a backing portion, an underlay portion overlying said backing portion and containing finely divided pigment of said first first color, a base portion overlying said underlay portion and being colored with said second color, and a thin overlay portion overlying said base portion and containing finely divided pigment of said third color.

12. A laminate in accordance with claim 10 wherein said first color is a darker color than said second and third colors.

13. A laminate in accordance with claim 11 wherein said underlay layer contains a plurality of discretely spaced first colors.

14. In a unitary decorative laminate having registered color and embossing, comprising a plurality of cured resin impregnated layers laminated together, and also including a backing, said layers including a thermoset resin impregnated print sheet above said backing and a generally transparent thermoset resin impregnated overlay sheet above said print sheet, the improvement comprising:
   the upper surface of said laminate having debossed portions, embossed portions of intermediate height of 2–10 mils, and embossed high peaks of 14–24 mils height;
   the upper layer of said laminate having therein at least one first color in the area of said high peaks;
   said debossed portions being relatively devoid of pigment above said layer of said print sheet, and being substantially transparent to show therebeneath a second color which is the color of said print sheet; and
   said intermediate embossed portions having concentrated amounts of pigment of a third color above the surface of said print sheet layer and in an amount sufficient to substantially mask said second color, wherein the quantity of said pigment of said third color is greater at said intermediate embossed portions and becomes progressively less toward said debossed portions to provide gradations in color between said second and third colors from said debossed portions to said intermediate embossed portions.

* * * * *